United States Patent Office 3,379,783
Patented Apr. 23, 1968

3,379,783
PROCESS FOR PREPARING POLYALKYL-
TETRAHYDRONAPHTHALENES
Samuel J. Kahn, Rutherford, N.J., assignor to Universal
Oil Products Company, Des Plaines, Ill., a corporation
of Delaware
No Drawing. Filed Sept. 20, 1965, Ser. No. 488,762
7 Claims. (Cl. 260—668)

ABSTRACT OF THE DISCLOSURE

Preparation of polyalkyltetrahydronaphthalene by reacting a 2,3-dimethylbutene with an alpha-methylstyrene in the presence of a cation exchange resin catalyst at a temperature of 65°–120° C.

---

This invention relates to a process for preparing polyalkyltetrahydronaphthalenes and more particularly to a process for preparing 1,1,3,4,4 - pentamethyl - 6-alkyltetrahydronapthalenes.

Polyalkyl substituted 1,2,3,4 - tetrahydronaphthalenes are valuable compounds, particularly in the perfume industry, due to the fact that these compounds, upon acylation, have odors which closely resemble the highly expensive, naturally occurring macrocyclic musks such as muscone or civetone.

Heretofore, polyalkyltetrahydronaphthalenes and especially polyalkyltetrahydronaphthalenes which are acylated for use in perfumery have been prepared principally either by a cyclialkylization method such as, for example, the condensation of a 2,5-dihalo-2,5-dimethylhexane with an alkyl substituted benzene in the presence of a Friedel-Crafts catalyst or by a cyclodehydration method such as, for example, the cyclization of tertiary alcohol such as 1,1,2,4-tetramethyl-4-(p-tolyl)-pentanol in the presence of an acid catalyst. Another method of synthesis which recently has become of interest, primarily due to the fact that the specific type of polyalkyltetrahydronaphthalenes produced thereby, upon acylation, possesses an extremely desirable musk-like odor, is a method which utilizes a p-cymylcarbonium ion intermediate. In this method of synthesis, a p-cymylcarbonium ion, formed either by a hydride transfer from p-isopropyltoluene or by the addition of a proton to dimethyl-p-tolylcarbinol or p-α-dimethylstyrene, is reacted in the presence of a strong acid catalyst such as concentrated sulfuric acid at a low temperature in the order of about 0° to 30° C., with olefins or alcohols such as 2,3-dimethylbutenes or 2,3-dimethyl-2-butanol to form the polyalkyltetrahydronaphthalene.

While the p-cymylcarbonium ion method of synthesis is the most straightforward method for preparing the polyalkyltetrahydronaphthalenes having the most desirable structure, namely 1,1,3,4,4,6 - hexaalkyl - 1,2,3,4-tetrahydronaphthalenes, for subsequent acylation to obtain compounds possessing fine musk-like odors, it nevertheless has not found wide commercial acceptance. The principal reason for this is that the reaction is extremely costly to carry out, and this is mostly due to the fact that the conversion of the very expensive reactants to product is very low, and moreover even the small amount of product produced is very difficult and costly to recover in pure form from the reaction mass containing copious quantities of side products. This serious problem of high cost is also severely compounded by the fact that the unrecated, highly expensive 2,3-dimethylbutene starting material is not recoverable for reuse in any appreciable quantity because of its substantial consumption in the formation of the product contaminating side products. It has now been discovered, however, that polyalkyltetrahydronapthalenes may be prepared according to the carbonium ion method of synthesis with high conversions of reactants and moreover in remarkably good yields with recoverable and reusable 2,3 - dimethyl-butene starting material by utilizing a cation exchange resin as a catalyst in combination with unusually high temperatures to effect the reaction of a substituted styrene compound and a 2,3-dimethylbutene.

Accordingly, an object of this invention is to provide a process for preparing polyalkyltetrahydronaphthalenes useful as intermediates in the preparation of perfume materials having fine musk-like odors. Another object is to provide a process for preparing polyalkyltetrahydronaphthalenes involving the reaction of a substituted styrene and a 2,3-dimethylbutene which is effected within an elevated temperature range in the presence of a cation exchange resin. A still further object is to provide a process for preparing polyalkyltetrahydronaphthalenes by reacting a substituted styrene and a 2,3 - dimethylbutene at elevated temperatures in the presence of a cation exchange resin having sulfonic acid functional groups whereby the tetrahydronaphthalene produced is obtained economically in high yield simultaneously with readily recoverable and reusable 2,3-dimethylbutene starting material. Other objects of this invention will become apparent from the following further detailed description thereof.

The polyalkyltetrahydronaphthalenes prepared according to the process of this invention may be represented by the following structural formula:

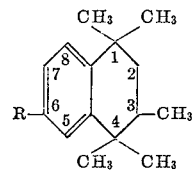

in which R is hydrogen or a lower alkyl radical of from 1 to about 5 carbon atoms. Examples of polyalkyltetrahydronaphthalenes having this structure include: 1,1,3, 4,4 - pentamethyl - 1,2,3,4-tetrahydronaphthalene; 1,1,3, 4,4,6 - hexamethyl - 1,2,3,4-tetrahydronaphthalene; 1,1, 3,4,4 - pentamethyl - 6 - ethyl-1,2,3,4-tetrahydronaphthalene; 1,1,3,4,4 - pentamethyl - 6 - isopropyl-1,2,3,4-tetrahydronaphthalene; or 1,1,3,4,4 - pentamethyl-6-tertiarybutyl-1,2,3,4-tetrahydronaphthalene.

The polyalkyltetrahydronaphthalenes having the above general structure are prepared according to the process of this invention, as hereinbefore inducted, by reacting a substituted styrene compound with a 2,3-dimethylbutene at an elevated temperature within the range of from about 65° to 120° C. and in the presence of a cation exchange resin. The substituted styrene compound which may be used in the process has the following general structural formula:

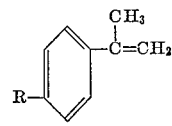

wherein R has the same meaning as above. Examples of the substituted styrene compound include α-methylstyrene; p-α-dimethylstyrene; p-ethyl-α-methylstyrene; p-isopropyl-α-methylstyrene; or p-tertiary-butyl-α-methylstyrene. The styrene compound used in the reaction need not be of extremely high purity and conveniently a relatively impure mixture containing as low as 80 percent of the styrene compound may be readily utilized in the process of this invention without a substantial reduction in product yield. The 2,3-dimethylbutene reactant which may be used in the process of this invention comprises either 2,3-dimethylbutene-1 or 2,3-dimethylbutene-2 or any mixture thereof. While the 2,3-dimethylbutene-1, according to carbonium ion theory, is the olefin isomer required for the polyalkyltetrahydronaphthalene formation, it is possible to also use 2,3-dimethylbutene-2 inasmuch as the 2-isomer will rearrange by isomerization under the conditions of the process of this invention to form the 1-isomer. Accordingly, the 2,3-dimethylbutene reactant may comprise either the 1 or 2 isomer or any mixture thereof. Conveniently, a suitable 2,3-dimethylbutene reactant comprising a mixture of the 1 and 2 isomers may be readily obtained from the dehydrohalogenation and isomerization of neohexyl chloride.

The reaction of the substituted styrene compound and the 2,3-dimethylbutene reactant effected according to the process of this invention to produce polyalkyltetrahydronaphthalenes may be illustrated by the following equation using, for illustrative purposes only, p-α-dimethylstyrene as the styrene reactant to form 1,1,3,4,4,6-hexamethyl-1,2,3,4-tetrahydronaphthalene

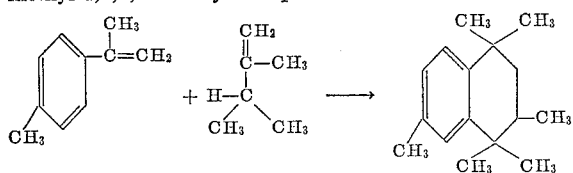

It is obvious of course, that different polyalkyltetrahydronaphthalenes will be produced depending upon the particular styrene compound used in the process. For example, if p-ethyl-α-methylstyrene is used then 1,1,3,4,4-pentamethyl - 6 - ethyl - 1,2,3,4 - tetrahydronaphthalene will be produced and if p-isopropyl-α-methylstyrene, then 1,1,3,4,4-pentamethyl-6-isopropyl-1,2,3,4-tetrahydronaphthalene will be produced.

The catalyst which is used in combination with the elevated temperature range according to the process of this invention to achieve the highly desirable results of producing excellent yields of polyalkyltetrahydronaphthalenes simultaneously with readily recoverable and reusable, unreacted 2,3-dimethylbutene starting materials comprises a cation exchange resin. The cation exchange resins used for this purpose are well known materials and, in general, are defined as natural or synthetic materials which are practically insoluble in water and in organic solvents and which have polar functional groups containing labile cations that will exchange with other ions in a surrounding solution. The materials of which the resins are made comprise a wide variety of substances and include natural materials such as coal, lignite or peat or synthetic polymeric materials such as phenol-formaldehyde polymers, polystyrene polymers or polystyrene polymers cross-linked with divinyl benzenes. The polar functional groups giving rise to the cation exchange properties of the resins include such groups as sulfonic, methylene sulfonic, carboxylic or phenolic and are incorporated into the resinous materials by a variety of treatments or in the case of certain synthetic polymers are incorporated into the polymer by using a monomer in the polymerization containing the polar group.

Of the many different types of cation exchange resins which may be used in the process of this invention, the synthetic polymeric materials having sulfonic or methylene sulfonic polar functional groups are the preferred cation exchange resins for use in the process of this invention. These types of cation exchange resins are available commercially in both active and unactivated forms under such trademarks as Amberlite, Dowex or Amberlyst.

In using the cation exchange resins, and preferably the synthetic resins containing sulfonic acid functional groups, in the process of this invention, the conventional techniques long used in ion exchange resin applications should be observed. Thus, care should be taken to avoid fouling or poisoning of the resin through contamination with heavy metal salts, and, since the resins are hygroscopic, it may be necessary to dry the resin prior to use to avoid any moisture deactivation. In using the cation exchange resins, it is preferable that the resin be in a finely divided state so as to provide an adequate contacting surface area. Generally, an effective particle size for the resins is a diameter ranging from about 0.4 to 0.6 millimeter.

While the process of this invention may be effected without the use of a solvent, more desirable results are obtained when a solvent is utilized. Such solvent may comprise either an excess of the 2,3-dimethylbutene reactant or, more preferably, an aromatic hydrocarbon, such as benzene or toluene. The use of such aromatic solvents at the elevated temperatures used in the process of this invention is most surprising, however, as it normally would be expected that the 2,3-dimethylbutene reactant would be consumed in the presence of a cation exchange resin through alkylation of the aromatic solvent and thus lower the product yield and, moreover, preclude the recovery of any unreacted 2,3-dimethylbutenes not consumed in the tetrahydronaphthalene formation. Actually, however, such is not the case as there is little, if any, butene alkylation of the aromatic solvent, and the 2,3-dimethylbutenes not consumed in the tetrahydronaphthalene formation are readily recoverable.

As hereinbefore indicated the temperature at which the reaction is effected is very important to the success of the process of this invention. The temperature which is used in combination with the cation exchange resin must be above about 65° C. and should not substantially exceed above about 120° C. The use of temperatures outside this range and, in particular, below this range results in a substantial reduction in the yield of tetrahydronaphthalene obtained. Advantageously, the reaction is effected under atmospheric pressures at the refluxing temperature of the reaction mixture which may be conveniently regulated by the use of an aromatic solvent of the above described class. The most preferable temperature within the above range utilized for the reaction will vary depending upon such factors as the particular reactants used, the type of solvent, if any, present in the reaction mixture and the particular cation exchange resin utilized. Generally, however, when using benzene as a solvent and a synthetic cation exchange resin having sulfonic acid functional groups, the temperature range is preferably maintained within from about 70° to 85° C. for optimum results.

The use of the relatively high temperatures in the process of this invention is most surprising, however, as it was heretofore necessary in the preparation of polyalkyltetrahydronaphthalenes involving the reaction of 2,3-dimethylbutenes with styrenes to effect the reaction at very low temperatures of the order of about 0° or lower to 30° C. to prevent the olefins from polymerizing and the styrenes from dimerizing to the severe detriment of the polyalkyltetrahydronaphthalene formation. A possible explanation for the successful use of high temperatures in the process of this invention is that the cation exchange resin in some way favors the reaction of the 2,3-dimethylbutene and the styrene compound to form the desired polyalkyltetrahydronaphthalene and not the side reactions of polymerization and dimerization which deleteriously affect the tetrahydronaphthalene formation.

The ratio of the reactants used in the process of this invention is not critical, and generally a stoichiometric quantity of about one mol of the styrene compound to about one mol of the 2,3-dimethylbutene reactant may be conveniently utilized. The quantity of the cation exchange resin is also not critical and the amount used will vary depending upon such factors as the particular resin used, the particle size of the resin, the polymeric structure of the resin, e.g., type of cross-linkage, the specific compounds being reacted and the reaction rate desired. Generally, however, the amount of cation exchange resin used may range from about 1 to 50 percent by weight of the 2,3-dimethylbutene reactant with amounts ranging from about 3 to 10 percent generally being more conveniently utilized. When a solvent is utilized, and preferably an aromatic such as benzene, the amount of solvent should at least be sufficient to render the mixture of reactants and cation exchange resin readily stirrable. Generally, about one half to one weight part of solvent per one part of styrene compound is suitable for this purpose.

In carrying out the process of this invention, which is preferably effected in a batch-type operation, while it is possible to charge both of the reactants and the cation exchange resin to a reaction vessel followed by heating the mixture to the desired temperature to effect the reaction, a highly preferred procedure for optimizing results is to charge the cation exchange resin, the solvent, if one is used, and the 2,3-dimethylbutene to the reaction vessel, heat the mixture to the desired temperature range, then gradually add the styrene reactant to the stirred reaction mixture maintained at the desired temperature and thereafter maintain the desired temperature to complete the reaction. The optimum addition time of the styrene will vary depending upon such factors as the particular reaction temperature and the cation exchange resin used, but generally ranges from about 1 to 5 hours and more preferably about 3 hours. After the styrene addition is complete the reaction mixture is maintained within the essential temperature range for a period usually ranging from about 1 to 5 hours with the shorter period of about one hour being used for more active cation exchange resins.

When the reaction is complete, the liquid reaction mixture is separated from the cation exchange resin by conventional methods such as decantation or filtration which, because the resin used in the process is a solid, is readily and economically achieved. Because of the uniqueness of the process of this invention which permits the formation of large quantities of tetrahydronaphthalene product without destruction of the valuable, unreacted 2,3-dimethylbutene starting material in the formation of large amounts of tetrahydronaphthalene contaminating side products, the tetrahydronaphthalene product, the unreacted 2,3-dimethylbutene and the solvent may be readily recovered from the resin-free reaction mixture by simple fractionation. The tetrahydronaphthalene product fraction may then be recrystallized from a solvent such as isopropyl alcohol to obtain a high yield of pure polyalkyltetrahydronaphthalene.

As hereinbefore indicated, the process of this invention effected in the presence of a cation exchange resin in combination with an elevated temperature range has the amazing characteristic of permitting the reaction to take place principally between the styrene compound and the 2,3-dimethylbutene to form the desired polyalkyltetrahydronaphthalene with little or no loss of the unreacted 2,3-dimethylbutene through side product formation or alkylation of the aromatic solvent. This results in the highly desirable feature of being able to recover the 2,3-dimethylbutene for reuse which adds considerably to the overall desirability of the process of this invention by greatly lowering the cost of preparing polyalkyltetrahydronaphthalenes.

The polyalkyltetrahydronaphthalenes prepared according to the process of this invention as hereinbefore indicated may be acylated to obtain acylated polyalkyltetrahydronaphthalenes having very fine, musk-like odors which render them highly valuable for use in perfumery. The acylation may be effected according to conventional methods such as by reacting the polyalkyltetrahydronaphthalene with an acyl halide or acid anhydride in the presence of an acid-acting catalyst. Examples of acylated polyalkyltetrahydronaphthalenes having fine, musk-like odors include 7-acetyl-1,1,3,4,4,6-hexamethyl-1,2,3,4,-tetrahydronaphthalene or 7-acetyl1,1,3,4,4-pentamethyl-6-ethyl-1,2,3,4-tetrahydronaphthalene.

The following examples are given to illustrate the process of this invention, but they are not intended to limit the generally broad scope of this invention in strict accordance therewith:

EXAMPLE I 1,1,3,4,4,6-hexamethyl-1,2,3,4 - tetrahydronaphthalene was prepared according to the process of this invention by the following procedure:

About 87.5 grams of benzene, about 42.0 grams of an olefinic mixture containing about 97.5 percent by weight of a mixture of the 1 and 2 isomers of 2,3-dimethylbutene (0.486 mol) and about 3.5 grams of a cation exchange resin containing sulfonic acid functional groups (Amberlyst 15) were charged to a reaction flask equipped with heating and stirring means. The mixture was heated with stirring to a reflux temperature of about 75° C. Then about 70 grams (containing 0.5 mol) p-α-dimethylstyrene were slowly added by means of an addition funnel to the refluxing mixture over a period of about three hours. The reaction mixture was then refluxed for about another hour to complete the reaction with the refluxing temperature ultimately rising up to about 87° C. The liquid reaction product was decanted from the resin layer to recover about 199 grams of a liquid product mixture. The mixture was treated with about 1 gram of sodium carbonate and then fractionated under vacuum to recover about 96 grams of a benzene-2,3-dimethylbutene fraction analyzing by Gas-Liquid Chromatography (G.L.C.) as containing 18 percent of 2,3-dimethylbutenes or 0.206 mol and about 40 grams of a product fraction analyzing by G.L.C. as containing 72.0 percent of tetrahydronaphthalene or 0.133 mol. Accordingly, the yield of tetrahydronaphthalene on consumed 2,3-dimethylbutenes was 47.5 percent and the conversion was 27.3 percent.

The tetrahydronaphthalene product was recovered from the product fraction by mixing the fraction with about 40 grams of isopropyl alcohol at 50° C. followed by cooling to about 0° C. The solid tetrahydronaphthalene product was then filtered from the alcohol solution and dried to recover about 25 grams of 1,1,3,4,4,6-hexamethyl-1,2,3,4-tetrahydronaphthalene of 98.6 percent purity having a melting point of 65° to 66° C.

EXAMPLE II 1,1,3,4,4-pentamethyl-6-ethyl-1,2,3,4 - tetrahydronaphthalene is prepared to the process of this invention by the following procedure:

About 87.5 grams of benzene, about 42 grams of an olefinic mixture containing about 97.5 percent by weight of a mixture of the 1 and 2 isomers of 2,3-dimethylbutene (0.486 mol) and about 3.5 grams of a cation exchange resin having sulfonic acid functional groups are charged to a reaction flask equipped with heating and stirring means. The mixture is heated with stirring to reflux temperature and then about 73 grams (0.5 mol) of p-ethyl-α-methylstyrene are slowly added by means of an addition funnel to the refluxing mixture over a period of about three hours while maintaining refluxing temperature. The reaction mixture is thereafter refluxed for about 1 hour to complete the reaction. The liquid reaction product is decanted from the resin catalyst layer to recover a liquid product mixture. The mixture is treated with sodium carbonate and then fractionated under vacuum to recover a benzene-2,3-dimethylbutene fraction and a liquid product fraction boiling at 102° to 105° C. at 2 mm. Hg pressure and having a refractive index of $n_D^{20}$ 1.515 to 1.516.

I claim as my invention:

1. A process for preparing a polyalkyltetrahydronaphthalene of the formula:

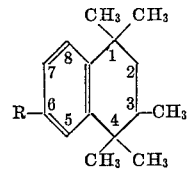

wherein R is selected from the group consisting of hydrogen and an alkyl radical of from 1 to about 5 carbon atoms which comprises gradually adding an α-methylstyrene substituted in the para position with an R group as defined above to a mixture of a 2,3-dimethylbutene and a catalyst comprising a cation exchange resin maintained at a temperature within the range of from about 70° C. to 85° C., reacting said styrene and butene at said temperature, and thereafter recovering the polyalkyltetrahydronaphthalene product.

2. The process according to claim 1 wherein the styrene compound is p-α-dimethylstyrene and the polyalkyltetrahydronaphthalene produced is 1,1,3,4,4,6-hexamethyl-1,2,3,4-tetrahydronaphthalene.

3. The process according to claim 1 wherein the catalyst comprises a cation exchange resin having sulfonic acid functional groups.

4. The process according to claim 1 wherein the reaction is effected in the presence of an aromatic hydrocarbon solvent and at the refluxing temperature of the reaction mixture.

5. A process for preparing 1,1,3,4,4,6-hexamethyl-1,2,3,4-tetrahydronaphthalene which comprises gradually adding p-α-dimethylstyrene to a mixture of an olefinic mixture containing 2,3-dimethylbutene-1 and 2,3-dimethylbutene-2, benzene and a catalyst comprising a cation exchange resin having sulfonic acid functional groups maintained at refluxing temperature of from about 70° C. to 85° C., reacting said styrene and butene compounds at said refluxing temperature, and thereafter recovering the hexamethyltetrahydronaphthalene product.

6. A process for preparing 1,1,3,4,4,6-hexamethyl-1,2,3,4-tetrahydronaphthalene which comprises gradually adding p-α-dimethylstyrene to a mixture of an aromatic hydrocarbon solvent, a catalyst comprising a cation exchange resin having sulfonic acid functional groups and an olefinic mixture containing 2,3-dimethylbutene-1 and 2,3-dimethylbutene-2 maintained at refluxing temperature of from about 70° C. to 85° C., maintaining said refluxing temperature until the reaction is complete, and thereafter recovering the hexamethyltetrahydronaphthalene product.

7. A process for preparing 1,1,3,4,4,6-hexamethyl-1,2,3,4-tetrahydronaphthalene which comprises gradually adding p-α-dimethylstyrene over a period of about 1 to 5 hours to a mixture of benzene, a catalyst comprising a cation exchange resin having sulfonic acid functional groups and an olefinic mixture containing 2,3-dimethylbutene-1 and 2,3-dimethylbutene-2 maintained at refluxing temperature within the range of about 70° to 85° C., maintaining the temperature at reflux until the reaction is complete, and thereafter recovering the hexamethyltetrahydronaphthalene product.

References Cited
UNITED STATES PATENTS

| | | | |
|---|---|---|---|
| 2,851,501 | 9/1958 | Benz et al. | 260—688 |
| 3,037,052 | 5/1962 | Bortnick | 260—671 XR |
| 3,161,692 | 12/1964 | McLaughlin et al. | 260—669 |
| 3,246,044 | 4/1966 | Wood et al. | 260—668 |
| 3,278,621 | 10/1966 | Stofberg et al. | 260—688 |

OTHER REFERENCES

Wood et al., J. Org. Chem., vol. 28, September 1963, pp. 2248–2255, QD 241. J 6.

DELBERT E. GANTZ, *Primary Examiner.*

C. R. DAVIS, *Assistant Examiner.*